Sept. 27, 1955     J. P. FIKE     2,718,864
WELDING ALIGNMENT APPARATUS
Filed Nov. 22, 1952
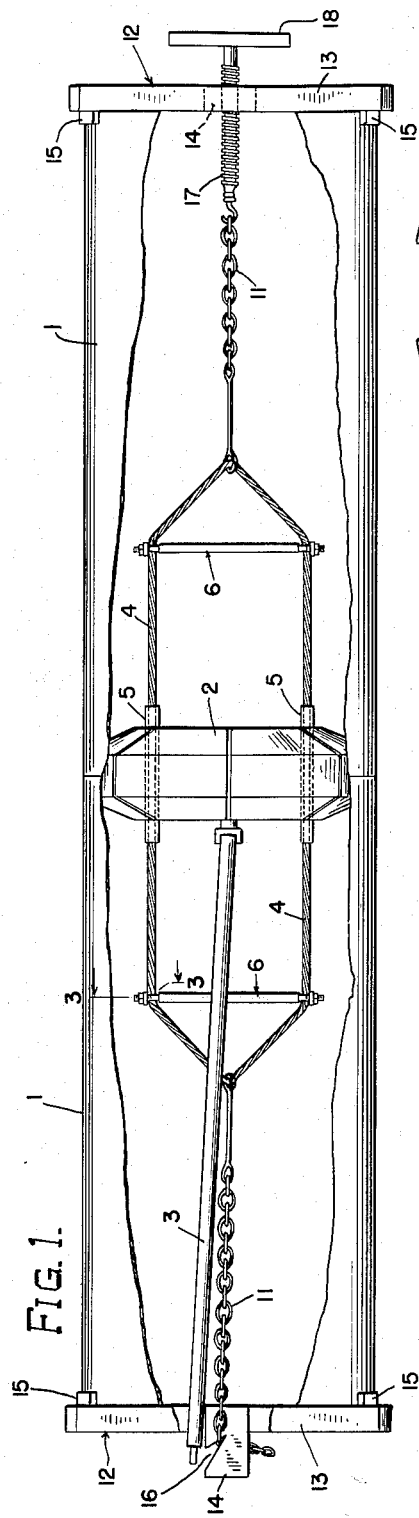
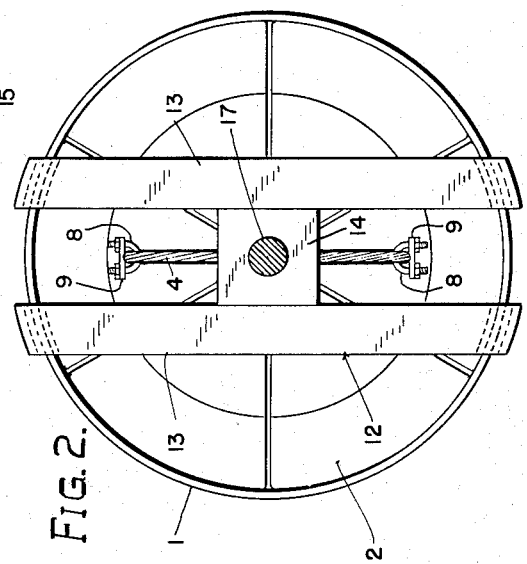
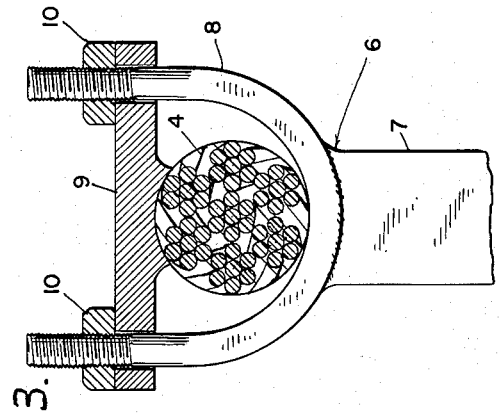
*INVENTOR.*
JOHN P. FIKE
BY *Andrus & Scealer*
ATTORNEYS

United States Patent Office 2,718,864
Patented Sept. 27, 1955

2,718,864

WELDING ALIGNMENT APPARATUS

John Price Fike, Milwaukee, Wis., assignor to A. O. Smith Corporation, Milwaukee, Wis., a corporation of New York Application November 22, 1952, Serial No. 322,133

4 Claims. (Cl. 113—102)

This invention relates to a welding alignment apparatus and more particularly to an apparatus for aligning the adjacent ends of two tubular members disposed in end-to-end relation in preparation for welding thereof.

It is the general procedure in the laying of gas and oil pipe lines to initially weld two pipe sections together to form a stringer and thereafter weld the stringer to the line. An automatic welding machine is sometimes employed to weld the stringers. To achieve a more efficient use of the welding machine it has been proposed to align the pipe sections on the ground and thereafter lift the aligned sections onto the machine so that the welding may be immediately accomplished without need for alignment of the pipe sections on the machine. More specifically, after the pair of pipe sections are aligned in an end-to-end relation on the ground an internal expandable aligning clamp is inserted within the sections and expanded into contact with the joint between the adjacent ends. The aligning clamp serves to maintain alignment of the pipe sections and support the molten weld metal during welding. The aligned pipe sections are then lifted from the ground onto an automatic welding machine by a device which bears against the upper portion of the joint between the pipe sections and prevents tilting of the sections by maintaining a straight-line relation therebetween. However, the pipe sections are generally not absolutely straight, so while the lifting device keeps the two pipe sections in a straight-line relation, the pipe sections tend to separate at the joint therebetween with the amount of separation depending on the irregularities in the pipe sections.

This separation between the pipe sections at the joint is undesirable, for in order to weld the sections the ends must be in substantial contact without a gap therebetween.

An object of the present invention is to provide an apparatus for maintaining the adjacent ends of pipe sections to be welded in substantial contacting relation during lifting or other movement of the pipe section regardless of the irregularities in contour of the pipe sections so that the sections may be welded without readjustment or re-alignment on the welding machine.

Another object is to provide an apparatus for maintaining the adjacent ends of pipe sections to be welded in tight bearing engagement and which is of simple construction and may be readily applied to the pipe sections in the field.

According to the present invention a loop of steel cable is inserted through a pair of longitudinal openings formed in an expandable aligning clamp which is disposed within the pipe sections. The clamp is aligned with the joint between adjacent ends of the pipe sections.

A chain is attached to one end of the loop and is removably secured to an end brace which bears against the outer end of one of the pipe sections.

A second chain is attached to the other end of the loop on the opposite side of the aligned clamp and this chain is secured to the inner end of an adjustable screw. The screw is threadedly engaged within an end brace which bears against the outer end of that pipe section. Manual rotation of the screw tightens the cable and tends to draw the pipe sections together to insure a firm engagement between the adjacent ends of the sections.

Other objects and advantages of the present invention will appear in the course of the following description.

In the drawing:

Figure 1 is an elevational view of the present invention as applied to a pair of pipe sections disposed in an end-to-end relation with parts of the pipe sections being broken away in section;

Fig. 2 is an end view of Figure 1 looking from the right in Figure 1; and

Fig. 3 is an enlarged fragmentary vertical section taken on line 3—3 of Figure 1 and showing the structure for spacing the cable loop.

Referring to the drawing there is shown an apparatus for aligning the adjacent ends of two tubular members, such as pipe sections, in preparation for welding the same.

The pipe sections 1 are disposed in an end-to-end relation and an aligning clamp 2 is located within the pipe sections and aligned with the joint between the adjacent ends of the pipe sections. The aligning clamp may be of any conventional type and is inserted into the pipe sections in collapsed condition and is thereafter expanded outwardly into contact with the pipe sections through rotation of rod 3. The aligning clamp 2 serves to align the adjacent ends of the pipe sections in proper welding position and also serves to support the molten weld metal during welding.

To insure that the adjacent ends of the pipe section are in tight bearing engagement before the aligning clamp is expanded, a loop or ring 4 of steel cable or the like is inserted through the clamp 2 and connected to the outer end of each pipe section. By tightening the loop of cable the pipe sections are drawn together and the adjacent ends of the sections are brought into tight engagement.

In order to provide a smooth passage for the cable through the aligning clamp 2, a pair of tubular members 5 are welded longitudinally to the end closures of the clamp. Members 5 extend through the aligning clamp 2 at diametrically opposite positions and are located so that they will not interfere with the expanding mechanism of the clamp.

To permit cable 4 to slide freely within tubular members 5 without binding, the cable is secured on either side of the aligning clamp 2 within a spacing member 6 so that the cable loop will have a constant width in the vicinity of the aligning clamp equal to the distance between the tubular members 5.

Each spacing member 6 comprises a connecting bar 7 having a generally U-shaped head 8 secured to each end thereof. Cable 4 is received within the U-shaped head 8 and clamped therein by brackets 9. The threaded outer ends of heads 8 extend through suitable openings in brackets 9 and the brackets are tightened against the cable by threading home the nuts 10 on the ends of heads 8.

Each end of the cable loop 4 outwardly of the respective spacing members 6 is connected by a chain 11 to an end brace 12 which is disposed across the outer end of the respective pipe sections 1.

Each end brace 12 comprises a pair of generally parallel bars 13 which are connected together at their mid points by a block 14.

To maintain the end braces 12 in firm engagement with the ends of the respective pipe sections 1, the outer end of each bar 13 is provided with a pair of spaced, inwardly extending flanges 15. The flanges 15 are generally curved to conform with the curvature of the pipe sections, and the ends of the sections are received between the respective spaced flanges.

The attachment of one of the chains 11 to the respective end brace 12 is accomplished by inserting the chain within a notch 16 formed in the corresponding block 14.

The outer end of the other chain 11 is attached to a swivel hook disposed on the inner end of a threaded screw 17. The screw 17 is threadedly engaged within block 14 of the corresponding end brace 12.

Manual rotation of screw 17 through handle 18 results in a tightening of cable loop 4 which tends to draw end braces 12 toward each other and serves to bring the adjacent ends of the pipe sections 1 together in tight engagement. Cable loop 4 is free to move within the tubular members 5 during the tightening operation.

To insure that the end braces 12 bear with equal pressure at opposite positions on the ends of each pipe section, the notch 16 and the adjusting screw 17 should be located along the longitudinal axis of the pipe sections 1.

The present invention is of extremely simple and inexpensive construction and yet provides an effective means of producing a tight engagement between the adjacent ends of the pipe sections so as to insure a good and lasting weld between the sections.

Various embodiments of the invention may be employed within the scope of the following claims.

I claim:

1. An apparatus for aligning the adjacent ends of two pipe sections to be welded which comprises an internal aligning clamp disposed within the pipe sections and aligned with the joint between the adjacent ends thereof, means for expanding said clamp into contact with said pipe sections to align the same in proper welding position, looped cable means extending through a pair of axial openings within said clamp, an end brace disposed across the outer end of each of said pipe sections, a connecting member connecting each end brace to said cable means at a position on the longitudinal axis of said clamp, and means connected to one of said end braces and to the corresponding connecting member for moving the corresponding connecting member relatively to said last named end brace to increase the tension on said cable means and draw the adjacent ends of said pipe section into tight bearing engagement.

2. An apparatus for aligning the adjacent ends of two pipe sections to be welded, which comprises an internal aligning clamp disposed within the pipe sections and aligned with the joint between the adjacent ends thereof, said clamp being adapted to be expanded into contact with said pipe sections to align the same in proper welding position, a looped cable extending through a pair of openings within said clamp, an end brace disposed across the outer end of each of said pipe sections with each of said braces being connected to said cable on opposite sides of said aligning clamp, means connected to said clamp and extending outwardly therefrom through an end brace for expanding said clamp into contact with the pipe sections, and tightening means connected to an end brace and extending outwardly therefrom for tightening said looped cable and drawing said end braces toward each other to bring the adjacent ends of said pipe sections into tight bearing engagement.

3. An apparatus for aligning the adjacent ends of two pipe sections to be welded, which comprises an internal aligning clamp disposed within the pipe sections and aligned behind the joint between the adjacent ends thereof, said clamp being adapted to be expanded into contact with said pipe sections to align the same in proper welding position, an end brace disposed on either side of said clamp in position to engage the outer end of each of said pipe sections, said end braces being provided with a generally curved recess to receive the edge of the respective pipe sections and maintain the end braces in position across the ends of said pipe sections, a looped connecting member disposed through openings in said clamp and connecting said end braces, actuating means connected to the clamp for expanding the clamp into contact with the pipe sections, and means connected to an end brace to move said connecting member relatively to said end brace to tighten said member and draw the adjacent ends of said pipe sections into tight bearing engagement before expansion of said aligning clamp.

4. An apparatus for aligning the adjacent ends of two pipe sections to be welded, which comprises an internal aligning clamp disposed within the pipe sections and aligned behind the joint between the adjacent ends thereof, said clamp being adapted to be expanded into contact with said pipe sections to align the same in proper welding position, a looped cable extending through a pair of openings within said clamp, an end brace disposed across the outer end of each of said pipe sections, a spacing member attached to said cable on either side of said aligning clamp to provide the portion of the cable extending between said members with a generally uniform width and enable the cable to slide freely within the openings in said aligning clamp, members connecting each end brace to said cable at a position on the longitudinal axis of said clamp, actuating means connected to the clamp and extending outwardly therefrom through an end brace for expanding said clamp into contact with the pipe sections, and means connected to an end brace and extending outwardly therefrom for moving the corresponding connecting member relative to said last named end brace to increase the tension on said cable and draw the adjacent ends of said pipe section into tight bearing engagement.

References Cited in the file of this patent

UNITED STATES PATENTS

| 1,871,326 | Koch | Aug. 9, 1932 |
| 1,922,324 | Price et al. | Aug. 15, 1933 |
| 2,167,338 | Murcell | July 25, 1939 |

FOREIGN PATENTS

| 367,095 | Germany | Jan. 16, 1923 |